United States Patent
Yamashita

(10) Patent No.: US 7,109,636 B2
(45) Date of Patent: Sep. 19, 2006

(54) DYNAMIC-QUANTITY SENSOR

(75) Inventor: Muneharu Yamashita, Toyama-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 161 days.

(21) Appl. No.: 10/896,916

(22) Filed: Jul. 23, 2004

(65) Prior Publication Data

US 2005/0052096 A1    Mar. 10, 2005

(30) Foreign Application Priority Data

Sep. 8, 2003    (JP) ............... 2003-315945

(51) Int. Cl.
*H01L 41/08* (2006.01)
(52) U.S. Cl. ................ 310/316.01; 310/319
(58) Field of Classification Search .......... 310/316.01, 310/317, 319
See application file for complete search history.

(56) References Cited

U.S. PATENT DOCUMENTS

| | | | | |
|---|---|---|---|---|
| 6,134,962 A | * | 10/2000 | Sugitani | 73/504.16 |
| 6,588,276 B1 | * | 7/2003 | Yamashita | 73/514.34 |
| 6,763,726 B1 | * | 7/2004 | Yamashita | 73/778 |

FOREIGN PATENT DOCUMENTS

| EP | 1 324 052 | 7/2003 |
|---|---|---|
| EP | 1 367 367 | 12/2003 |
| JP | 08-094664 | 4/1996 |
| JP | 2002-228452 A | 8/2002 |
| JP | 2002-267448 | 9/2002 |
| JP | 2003-254991 | 9/2003 |
| WO | WO 02073131 | 9/2002 |

OTHER PUBLICATIONS

Official Communication issued in the corresponding Japanese Patent Application No. 2003-315945, dated Jun. 6, 2006.

* cited by examiner

*Primary Examiner*—Mark Budd
(74) *Attorney, Agent, or Firm*—Keating& Bennett, LLP

(57) ABSTRACT

A dynamic-quantity sensor includes two piezoelectric vibrators which are arranged such that stresses generated by a dynamic quantity, such as acceleration, are applied in opposite phases to the piezoelectric vibrators. A current-voltage converting and signal adding circuit converts current signals flowing in the piezoelectric vibrators into voltage signals. A feedback signal processing circuit amplifies a combined signal of the two voltage signals and feeds back the combined signal to an acceleration sensing element, so that oscillation is performed. A self-diagnostic circuit including a series circuit including a switching circuit and a capacitor is provided between a reference potential (ground) and a node between one of the piezoelectric vibrators and a resistor in which a current of the one of the piezoelectric vibrators flows. Diagnosis is performed in accordance with whether or not a signal based on turning on and off of the switching circuit changes normally.

15 Claims, 8 Drawing Sheets

DYNAMIC-QUANTITY SENSOR

BACKGROUND OF THE INVENTION

1. Field of the Invention

The present invention relates to dynamic-quantity sensors for sensing a dynamic quantity, such as acceleration, angular acceleration, angular velocity, or load.

2. Description of the Related Art

The assignee of this application has proposed an acceleration sensor including a piezoelectric vibrator in Japanese Patent No. 3097464. The acceleration sensor includes a piezoelectric ceramic element for sensing acceleration, a signal processing circuit for processing an output signal from the piezoelectric ceramic element, and a fault self-diagnosing circuit for outputting a self-diagnostic signal to the piezoelectric ceramic element.

Also, an angular velocity sensor is disclosed in Japanese Unexamined Patent Application Publication No. 2002-267448. The angular velocity sensor includes a sensor element including a vibrating part and a sensing part for sensing angular velocity; and a driver circuit for supplying a driving signal to the vibrating part of the sensor element.

Also, the assignee of this application has proposed a dynamic-quantity sensor including a piezoelectric vibrator in Japanese Patent Application No. 2002-326605. Japanese Patent Application No. 2002-326605 corresponds to U.S. patent application Ser. No. 10/329,507 filed on Dec. 27, 2002. The dynamic-quantity sensor includes two piezoelectric vibrators to which stresses generated by a dynamic quantity are applied in opposite phases, a voltage signal applying circuit for applying a common voltage signal to the piezoelectric vibrators, a current-voltage converting circuit for converting current signals flowing in the piezoelectric vibrators into voltage signals, and a phase-difference signal processing circuit for detecting a phase difference between the voltage signals output from the current-voltage converting circuit and for outputting a dynamic quantity sensing signal.

An example of the structure of the dynamic-quantity sensor described in Japanese Patent Application No. 2002-326605 will now be described with reference to FIG. 8. The dynamic-quantity sensor includes an acceleration sensing element 10, a current-voltage converting and signal adding circuit 11, a feedback signal processing circuit 12, a phase-difference voltage converting circuit 13, and an amplification and filter circuit 14.

The acceleration sensing element 10 includes piezoelectric vibrators Sa and Sb to which stresses generated by a dynamic quantity are applied in opposite phases. The piezoelectric vibrators Sa and Sb are connected in series with resistors RLa and RLb, respectively. The current-voltage converting and signal adding circuit 11 converts current signals flowing in the piezoelectric vibrators Sa and Sb into voltage signals to be output as an Sa signal and an Sb signal, respectively. Also, the current-voltage converting and signal adding circuit 11 outputs a combined signal created from both signals.

The feedback signal processing circuit 12 amplifies the voltage of the combined signal, limits the amplitude, and outputs a voltage signal Vosc to the acceleration sensing element 10. The voltage signal Vosc is applied to a node between the piezoelectric vibrators Sa and Sb.

The phase-difference voltage converting circuit 13 generates a voltage signal that is proportional to a phase difference between the Sa signal and the Sb signal, which are converted to the voltage signals.

The amplification and filter circuit 14 amplifies the voltage signal converted by the phase-difference voltage converting circuit 13 with a predetermined gain and eliminates components in an unwanted frequency range to output an acceleration sensing signal.

In the circuits shown in FIG. 8, both the resonant frequencies of the piezoelectric vibrators Sa and Sb are adjusted to be equal to the frequency of the voltage signal Vosc and stresses in different phases, namely, compression (or tension) and tension (or compression), are applied to the piezoelectric vibrators Sa and Sb, respectively, so that an output signal is captured from the amplification and filter circuit 14.

A circuit for determining the occurrence of a fault in accordance with a change of a sensor output by sending a self-diagnostic signal to a piezoelectric ceramic element is described in Japanese Patent No. 3097464. Also, a structure in which a self-diagnosis is performed by applying a signal synchronized with a sensor element driving signal upstream of a demodulator is described in Japanese Unexamined Patent Application Publication No. 2002-267448. For example, if a dynamic-quantity sensor is used for vehicles, such a self-diagnostic function is essential for ensuring high reliability.

In the dynamic-quantity sensor described in Japanese Patent Application No. 2002-326605, however, current signals flowing in two piezoelectric vibrators to which stresses generated by a dynamic quantity are applied in opposite phases are converted into voltage signals and self-oscillation occurs due to a feedback circuit. Thus, the self-diagnostic circuit used in Japanese Patent No. 3097464 or Japanese Unexamined Patent Application Publication No. 2002-267448 cannot be used.

SUMMARY OF THE INVENTION

In order to overcome the problems described above, preferred embodiments of the present invention to provide a dynamic-quantity sensor that is capable of sensing a dynamic quantity by applying a voltage signal to two piezoelectric vibrators to which stresses generated by the dynamic quantity are applied in opposite phases and by detecting a phase difference between currents flowing in the piezoelectric vibrators, and that is provided with a self-diagnostic function.

A dynamic-quantity sensor according to a preferred embodiment of the present invention includes two piezoelectric vibrators to which stresses generated by a dynamic quantity are applied in opposite phases, a resistor being connected in a current path of each of the piezoelectric vibrators, a voltage signal applying circuit for applying a common voltage signal to the piezoelectric vibrators, a current-voltage converting circuit for converting current signals flowing in the piezoelectric vibrators into voltage signals, a phase-difference signal processing circuit for detecting a phase difference between the voltage signals output from the current-voltage converting circuit and for outputting a dynamic quantity sensing signal, and a series circuit including a capacitor and a switching circuit turning on or turning off in synchronization with an external control signal, the series circuit being provided between a constant potential and a node between one of the piezoelectric vibrators and the resistor.

The switching circuit may include a switching element for electrically connecting or disconnecting two input/output terminals in accordance with a control signal to a control terminal, a transistor connected in series with the switching element, and a bias circuit for turning on the transistor when the switching element is turned on. A series circuit including the switching element and the transistor may be provided between a supply voltage line and a ground, and one end of the capacitor may be connected to a node between the switching element and the transistor.

The dynamic quantity may be, for example, acceleration, angular acceleration, angular velocity, or a load.

According to preferred embodiments of the present invention, when a node between one of two piezoelectric vibrators and a resistor is connected to a constant potential, which is a reference potential, via a capacitor due to turning on of a switching circuit, the phase characteristics of the one of the piezoelectric vibrators change, and in accordance with this, the level of a dynamic quantity sensing signal sensed by a phase-difference signal processing circuit changes. Thus, in accordance with the output change, self-diagnosis can be performed.

Also, according to preferred embodiments of the present invention, a switching circuit includes a switching element for electrically connecting or disconnecting two input/output terminals in accordance with a control signal to a control terminal, a transistor connected in series with the switching element, and a bias circuit for turning on the transistor when the switching element is turned on. Thus, the transistor is turned off when the switching element is turned off, and one end of a capacitor connected to a node between the switching element and the transistor is equivalently open. Consequently, this is equivalent to the capacitor not being connected. A dynamic-quantity sensor including a voltage signal applying circuit, a current-voltage converting circuit, and a phase-difference signal processing circuit performs its original operation, and deterioration of the characteristics due to provision of the self-diagnostic circuit does not occur.

Other features, elements, characteristics and advantages of the present invention will become more apparent from the following detailed description of preferred embodiments thereof with reference to the attached drawings.

DETAILED DESCRIPTION OF PREFERRED EMBODIMENTS

The structure of a dynamic-quantity sensor according to a first preferred embodiment of the present invention will be described with reference to FIGS. 1, 2, 3A, and 3B.

Figure 1:
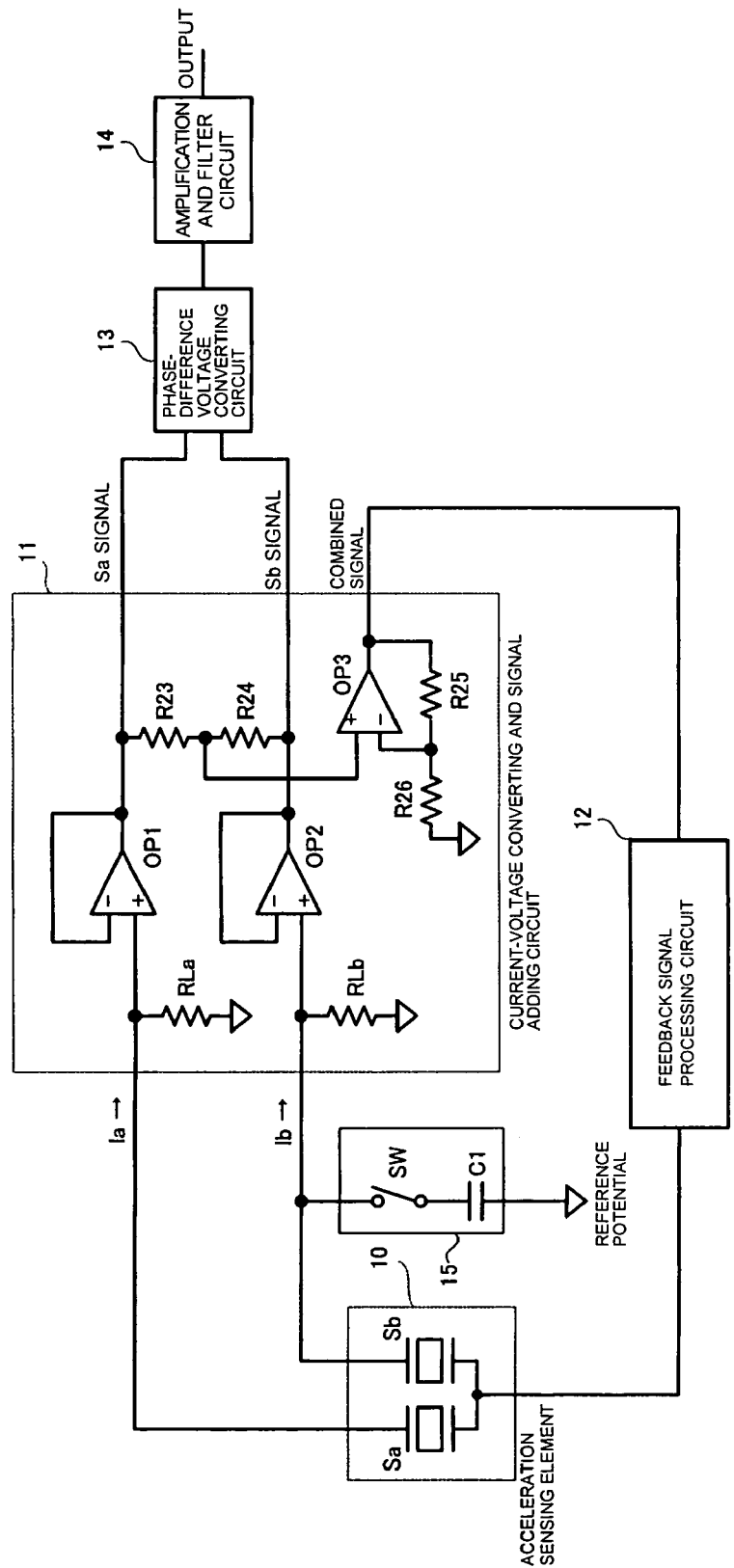
FIG. 1 is a block diagram showing the structure of an acceleration sensor according to a first preferred embodiment of the present invention.

FIG. 1 is a block diagram showing the structure of an acceleration sensor. The acceleration sensor preferably includes an acceleration sensing element 10, a current-voltage converting and signal adding circuit 11, a feedback signal processing circuit 12, a phase-difference voltage converting circuit 13, an amplification and filter circuit 14, and a self-diagnostic circuit 15.

The acceleration sensing element 10 includes piezoelectric vibrators Sa and Sb to which stresses by acceleration are applied in opposite phases. The current-voltage converting and signal adding circuit 11 converts current signals flowing in the piezoelectric vibrators Sa and Sb of the acceleration sensing element 10 into voltage signals to be output as an Sa signal and an Sb signal. The current-voltage converting and signal adding circuit 11 also outputs a combined signal of both signals. The feedback signal processing circuit 12 corresponds to a "voltage signal applying circuit" in preferred embodiments of the present invention. The feedback signal processing circuit 12 amplifies the voltage of the combined signal, limits the amplitude, controls the phase, and feeds the voltage signal back to a node between the piezoelectric vibrators Sa and Sb. The phase-difference voltage converting circuit 13 corresponds to a "phase-difference signal processing circuit" in preferred embodiments of the present invention. The phase-difference voltage converting circuit 13 generates a voltage signal that is proportional to a phase difference between the Sa signal and the Sb signal, which are converted to voltage signals.

The amplification and filter circuit 14 amplifies the voltage signal converted by the phase-difference voltage converting circuit 13 with a predetermined gain and eliminates components in an unwanted frequency range to output an acceleration sensing signal.

The self-diagnostic circuit 15, which is a series circuit including a switching circuit SW and a capacitor C1, is provided between a node between the piezoelectric vibrator Sb of the acceleration sensing element 10 and a resistor RLb provided at an input of the current-voltage converting and signal adding circuit 11 and a reference potential (in this example, a ground).

In the current-voltage converting and signal adding circuit 11, conduction currents Ia and Ib flowing in the piezoelectric vibrators Sa and Sb of the acceleration sensing element 10 flow through a resistor RLa and the resistor RLb, respectively. The current-voltage converting and signal adding circuit 11 adds voltage drops in the resistors RLa and RLb. In other words, each of the operational amplifiers OP1 and OP2 has a very high input impedance and defines a voltage follower circuit with a gain of 1. An operational amplifier OP3 and resistors R25 and R26 define a non-inverting amplifying circuit. Also, the non-inverting amplifying circuit and resistors R23 and R24 define an adding circuit for outputting a combined signal of output voltages of the operational amplifiers OP1 and OP2.

In the acceleration sensor shown in FIG. 1, the switching circuit SW is connected (turned on) for self-diagnosis. Turning on the switching circuit SW changes the phase characteristics of the piezoelectric vibrator Sb. In accordance with this, the phase of the Sb signal of the current-voltage converting and signal adding circuit 11 is changed.

Diagnosis is performed in accordance with whether or not the output represents a predetermined change due to this phase change.

A change in the phase characteristics of the piezoelectric vibrator Sb based on turning on and off of the switching circuit SW will now be described.

Figure 2:
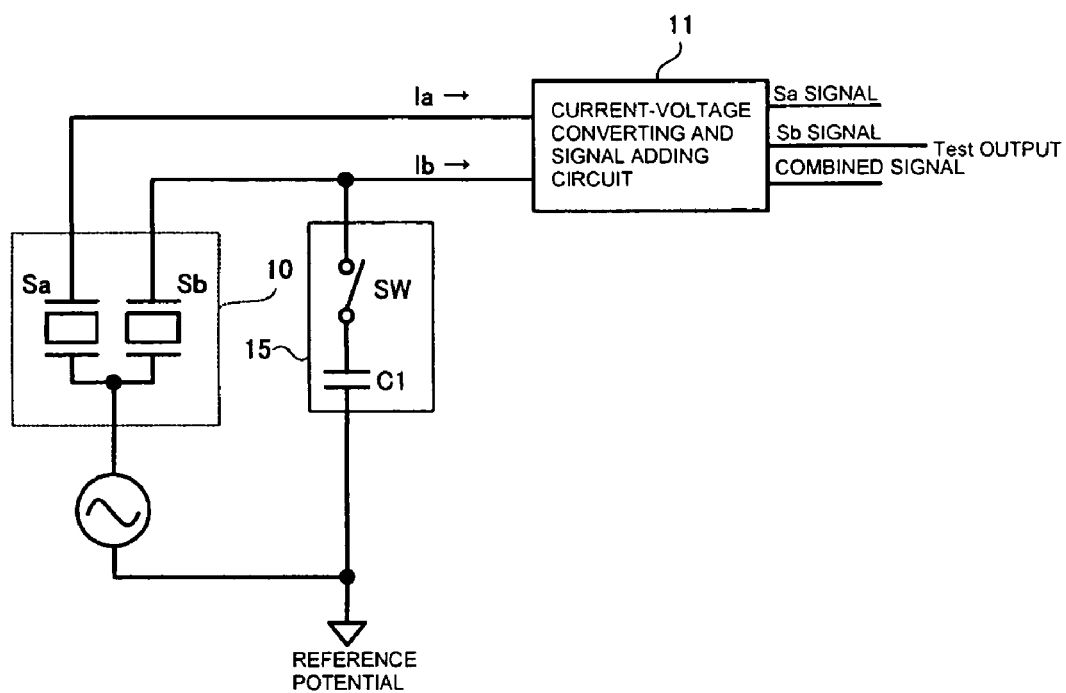
FIG. 2 is a circuit diagram for checking for a change in the characteristics by a self-diagnostic circuit of the acceleration sensor.

FIG. 2 shows a circuit for testing the phase characteristics of the piezoelectric vibrator Sb. Here, a test signal is input between the node in the acceleration sensing element 10 and the ground, and the Sb signal of the current-voltage converting and signal adding circuit 11 is measured.

Figure 3A:
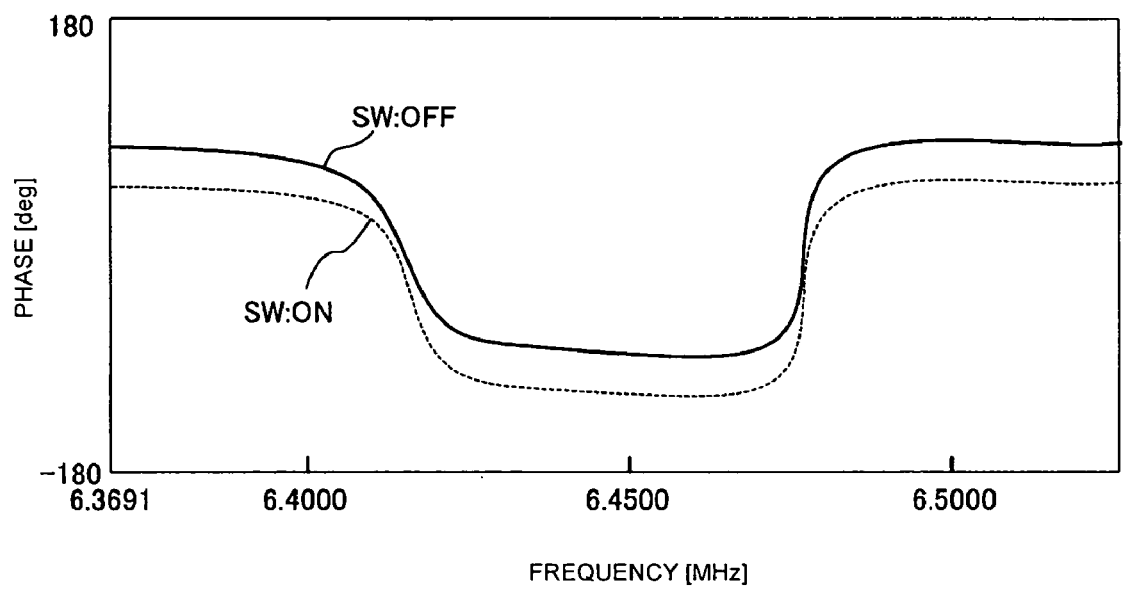
FIGS. 3A and 3B show the phase characteristics and the gain characteristics, respectively, of a signal output by the circuit shown in FIG. 2.
Figure 3B:
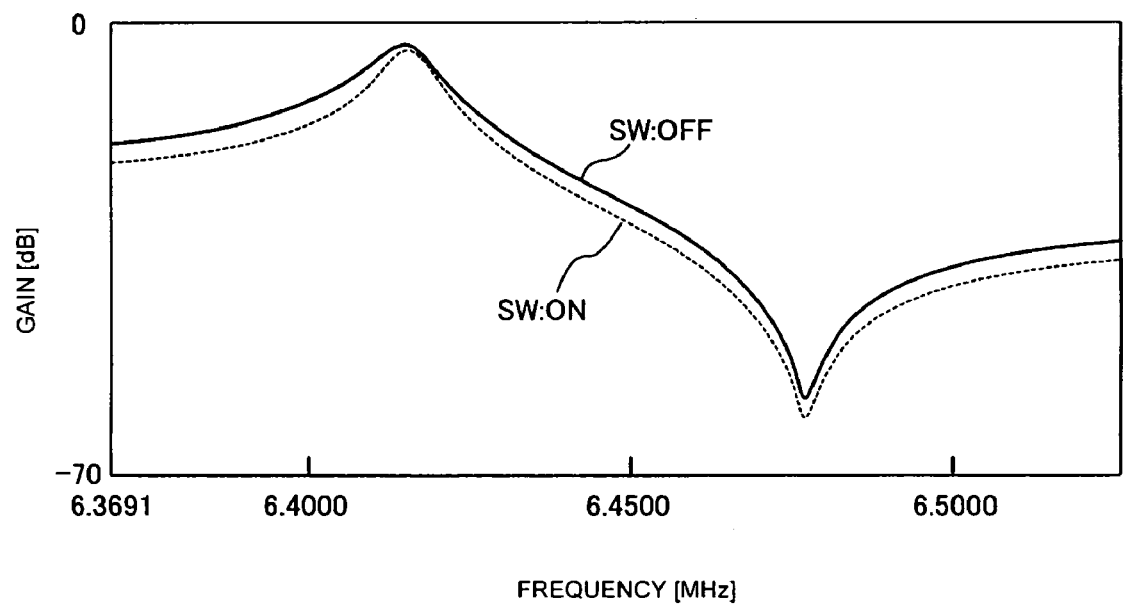

FIGS. 3A and 3B show the phase characteristics and the gain characteristics, respectively, of the Sb signal. In FIGS. 3A and 3B, the horizontal axis represents frequency. In FIG. 3A, the vertical axis represents phase, and in FIG. 3B, the vertical axis represents gain. As shown in FIG. 3A, in an on-state of the switching circuit SW, the phase of the Sb signal exhibits approximately a constant displacement over a relatively wide frequency range including the resonant frequency and the anti-resonant frequency of the piezoelectric vibrator Sb, compared with an off-state of the switching circuit SW. At this time, although the gain also changes, the width of the change is very small. In contrast, the Sa signal, which is the converted voltage signal of the piezoelectric vibrator Sa, exhibits almost no change in the phase characteristics or the gain characteristics, irrespective of turning on and off of the switching element SW. Accordingly, when oscillation is performed by feeding back via the feedback signal processing circuit 12, as shown in FIG. 1, stable oscillation can be achieved without greatly affecting oscillation by turning on or off of the switching circuit SW.

A specific circuit structure of the self-diagnostic circuit 15 and the characteristics of an acceleration sensor including the self-diagnostic circuit 15 according to a second preferred embodiment will be described with reference to FIGS. 4, 5, 6A, 6B, 6C, and 6D.

Figure 4:
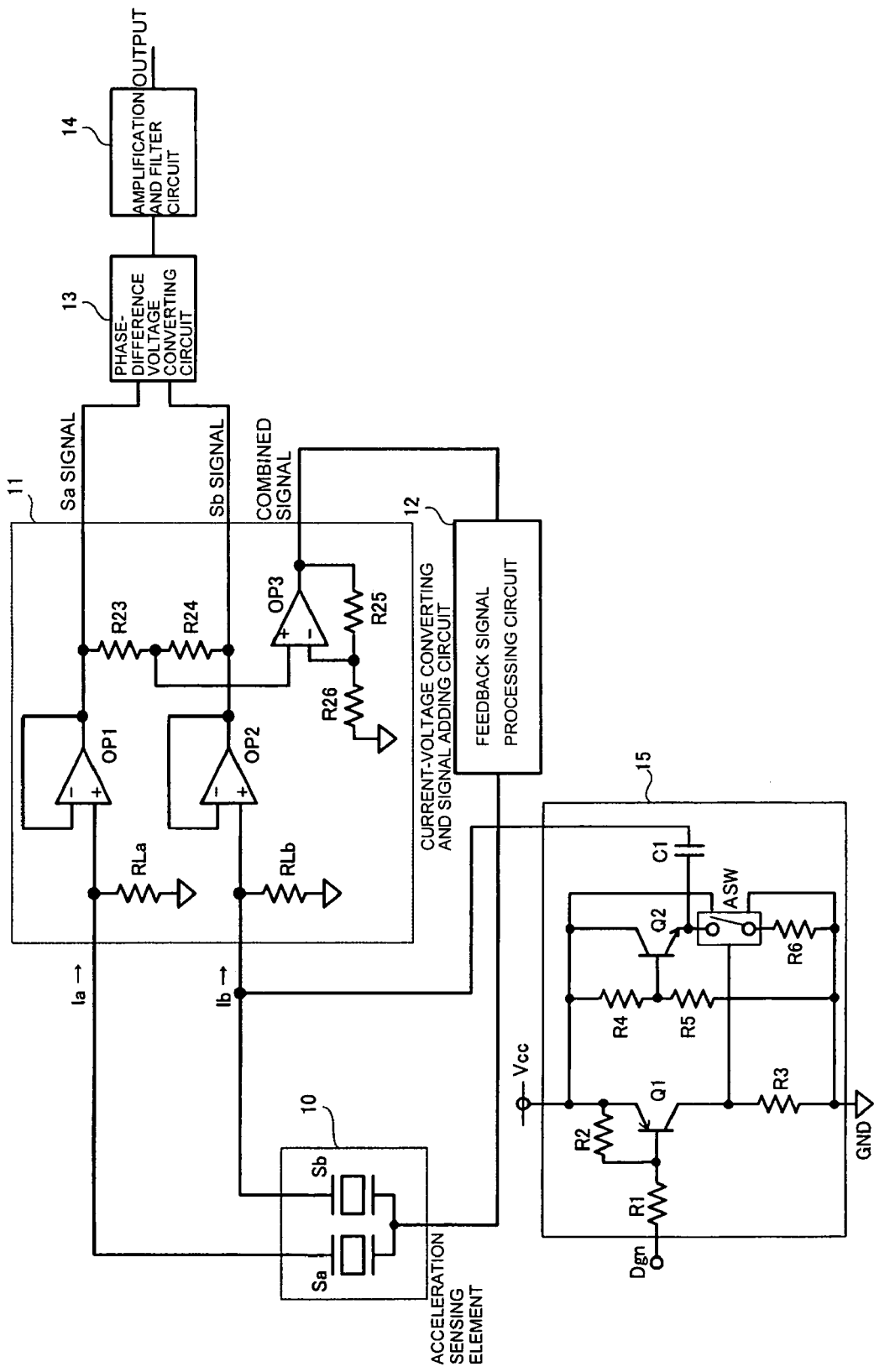
FIG. 4 is a block diagram showing the structure of an acceleration sensor according to a preferred second embodiment of the present invention.

Referring to FIG. 4, in the self-diagnostic circuit 15, Vcc denotes a supply voltage line for the self-diagnostic circuit 15 and other units of the acceleration sensor, and GND denotes a ground. Also, Dgn denotes a control signal input terminal and ASW denotes a switching element, which is a complementary metal-oxide semiconductor (C-MOS) analog switch described below. In the self-diagnostic circuit 15, a resistor R3 functions as a load resistor for a transistor Q1, and resistors R1 and R2 define a bias circuit for the transistor Q1. Also, resistors R4, R5, and R6 define a bias circuit for a transistor Q2.

The operation of the self-diagnostic circuit 15 will now be described.

When the control signal input terminal Dgn is at a low level (ground potential), the transistor Q1 is turned on. The potential of the collector of the transistor Q1 becomes high (approximately the same voltage as the supply voltage line Vcc), and the switching element ASW is connected or turned on. The turning on of the switching element ASW causes a base current of the transistor Q2 to flow and the transistor Q2 to be turned on. Thus, a constant potential equal to a voltage drop due to the emitter current of the transistor Q2 flowing in a resistor R6 is applied to one end of the capacitor C1.

When the control signal input terminal Dgn is at a high level (the voltage of the supply voltage line Vcc), the transistor Q1 is turned off and the switching element ASW is also turned off. The turning off of the switching element ASW causes the base current of the transistor Q2 to be blocked and the transistor Q2 to be turned off. Thus, the one end of the capacitor C1 is equivalently open. Consequently, since this is equivalent to the absence of the capacitor C1, a normal oscillation is performed.

In the self-diagnostic circuit 15 shown in FIG. 4, when the switching element ASW is turned off, the transistors Q1 and Q2 are also turned off. When self-diagnosis is not performed, power consumption due to the self-diagnostic circuit 15 can be made extremely small.

Figure 5:
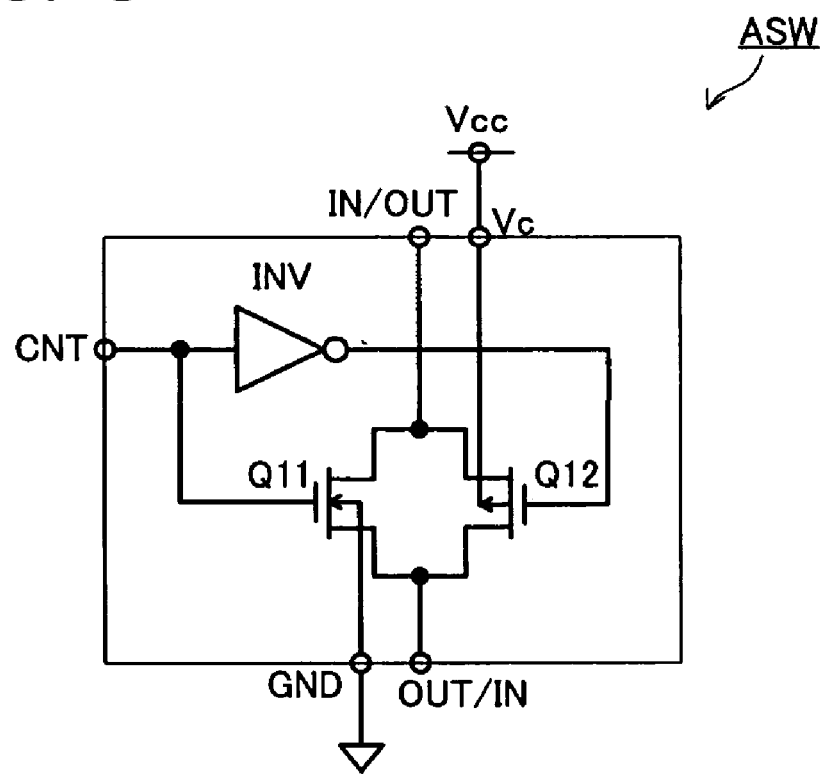
FIG. 5 is a circuit diagram showing the structure of a switching element in a self-diagnostic circuit.

FIG. 5 is a circuit diagram showing the structure of the switching element ASW. The switching element ASW includes MOS transistors Q11 and Q12 and an inverter INV. When a control signal input terminal CNT is high, the transistors Q11 and Q12 are turned on, and an input/output terminal IN/OUT and an output/input terminal OUT/IN are electrically connected. In contrast, when the control signal input terminal CNT is low, the transistors Q11 and Q12 are turned off and the input/output terminal IN/OUT and the output/input terminal OUT/IN are electrically disconnected. The inverter INV is a single-stage C-MOS circuit. When the switching element ASW is turned off, power consumption can be made extremely small.

Figure 6A:
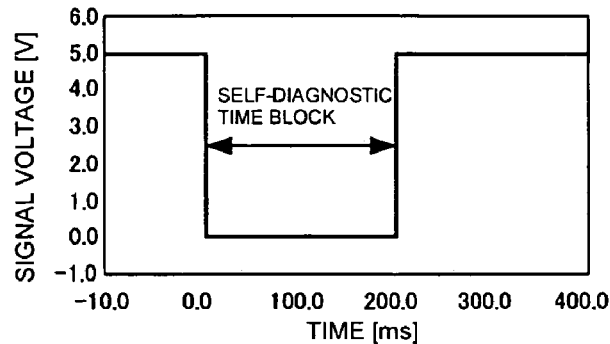
FIG. 6A shows a change in a control signal voltage when a self-diagnosis was performed, and FIGS. 6B to 6D each shows an example of a change in an output voltage when a self-diagnosis was performed.
Figure 6B:
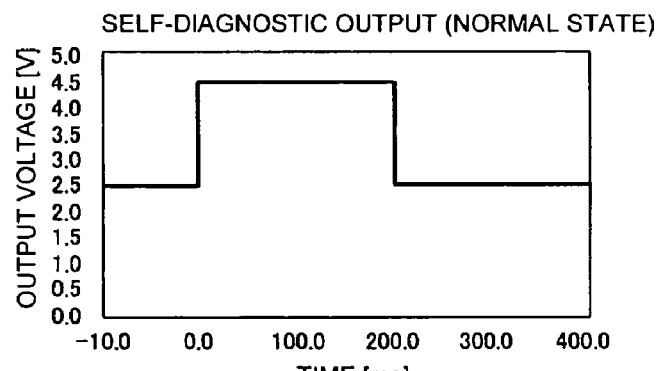
Figure 6C:
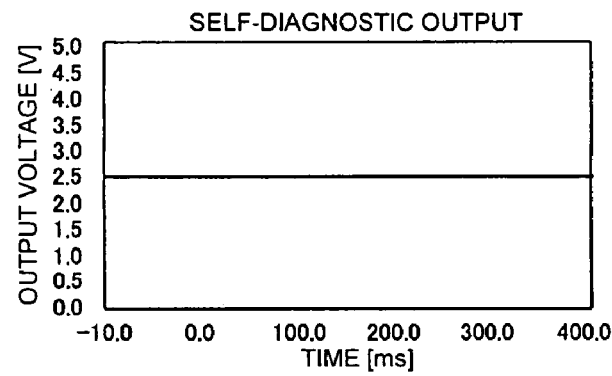
Figure 6D:
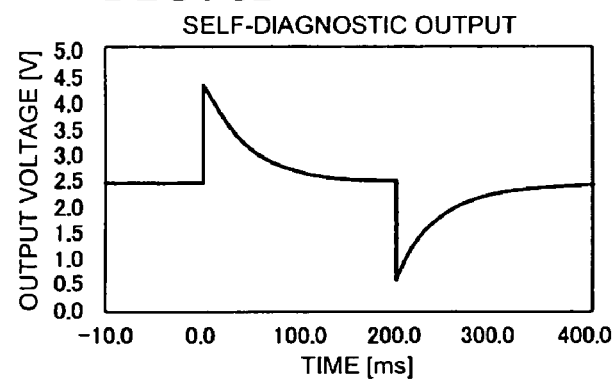

FIG. 6A shows a change in a control signal voltage when a self-diagnosis was performed, and FIGS. 6B to 6D each shows an example of a change in an output signal from the acceleration sensor when a self-diagnosis was performed. In the examples, a time block indicating 200 ms is set as a self-diagnostic time block. In other words, the control signal voltage at the control signal input terminal Dgn shown in FIG. 4 is low during the self-diagnostic time block.

In FIGS. 6B to 6D, the vertical axis represents an output voltage of the acceleration sensor. Each circuit is set such that the output voltage during the self-diagnostic time block changes from about 2.5 V to about 4.5 V.

FIG. 6B shows a waveform of a self-diagnostic output in a normal state.

FIG. 6C shows a waveform of a self-diagnostic output when one of the piezoelectric vibrators Sa and Sb of the acceleration sensing element 10 has trouble (is broken). Although oscillation is performed even if one of the piezoelectric vibrators Sa and Sb has mechanical trouble, a phase difference between the Sa signal and the Sb signal, which are outputs of the current-voltage converting and signal adding circuit 11, does not change. Thus, the output signal from the phase-difference voltage converting circuit 13 exhibits no change. As a result of this, the output voltage is constant, irrespective of the self-diagnostic time block. Thus, if a change of output voltages between the self-diagnostic time block and the other states is reduced or if the output voltage is constant at all times, it is determined that a fault (trouble in a piezoelectric vibrator) occurs.

FIG. 6D shows a waveform of a self-diagnostic output when the amplification and filter circuit 14 (a high-pass filter in the amplification and filter circuit 14) has a fault. When the output voltage during the self-diagnostic time block is not constant, it is determined that, for example, a filter circuit part has a fault in which a time constant varies due to a fault in a circuit element.

Although the self-diagnostic time block may be provided at the start of the use of the acceleration sensor, the self-diagnostic time block may be provided at a predetermined time interval in the normal operating state so that self-diagnosis can be performed substantially continuously.

Figure 7:
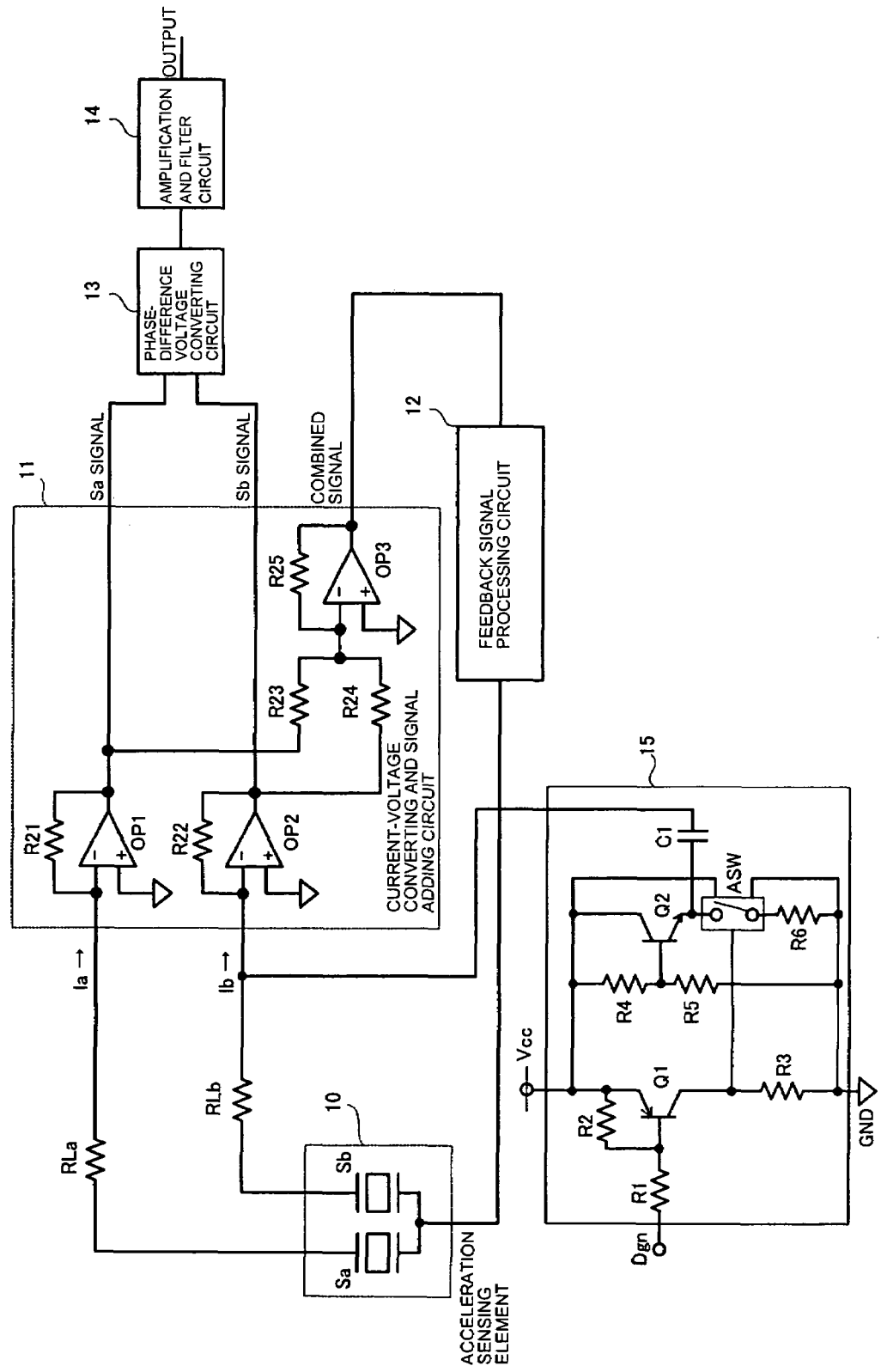
FIG. 7 is a block diagram showing the structure of an acceleration sensor according to a third preferred embodiment of the present invention.
Figure 8:
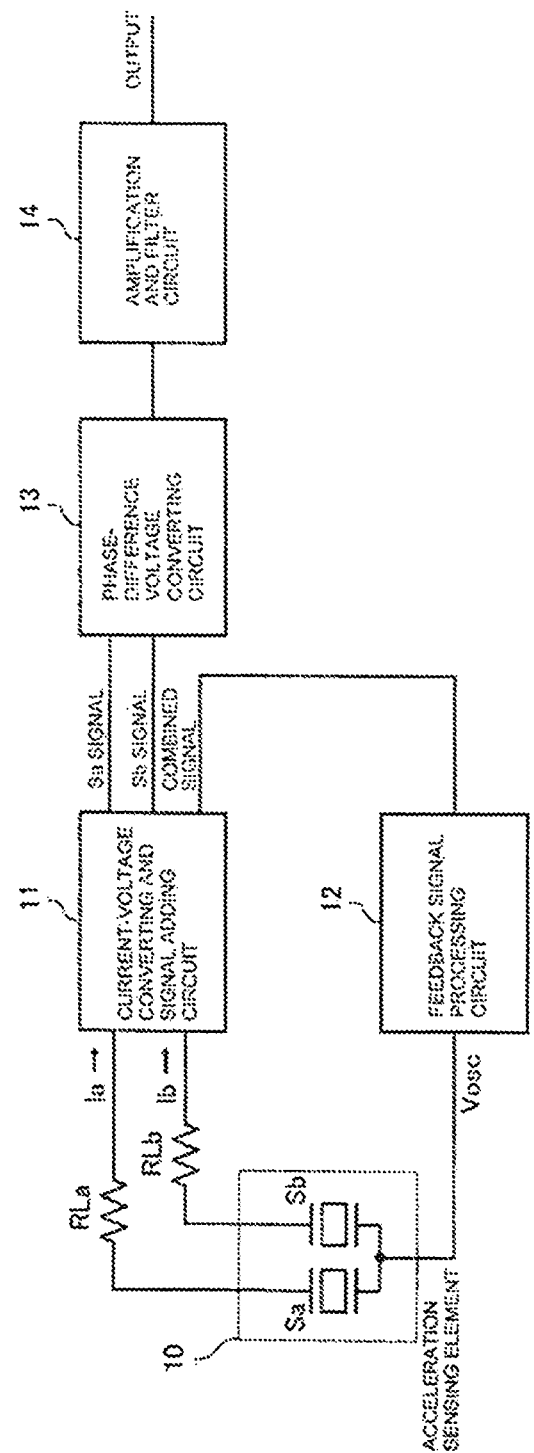
FIG. 8 is a block diagram showing the structure of an acceleration sensor in the related art.

FIG. 7 shows the structure of an acceleration sensor according to a third preferred embodiment of the present invention. The structure of the acceleration sensor according to the third preferred embodiment is different from the structure of the acceleration sensor according to the second preferred embodiment shown in FIG. 4 in the structure of the current-voltage converting and signal adding circuit 11. In the third preferred embodiment, the current-voltage converting and signal adding circuit 11 includes a first current-voltage converting circuit including the operational amplifier OP1 and a feedback resistor R21, and a second current-voltage converting circuit including the operational amplifier OP2 and a feedback resistor R22. Furthermore, the current-voltage converting and signal adding circuit 11 includes an adding circuit including an operational amplifier OP3 and the resistors R23, R24, and R25. Conduction currents Ia and Ib of the piezoelectric vibrators Sa and Sb of the acceleration sensing element 10 flow in the resistors RLa and RLb, respectively. Also the self-diagnostic circuit 15 is provided between the node between the piezoelectric vibrator Sb and the resistor RLb and the ground. The structure of the self-diagnostic circuit 15 is the same as that shown in FIG. 4. For such a circuit structure, the output voltage of the acceleration sensor also changes in accordance with a switching operation of the self-diagnostic circuit 15. Thus, diagnosis can be performed in accordance with whether or not the change is normal.

Although the acceleration sensor for sensing a stress difference applied to the piezoelectric vibrators Sa and Sb generated by acceleration is described in each of the preferred embodiments described above, any sensor for sensing a dynamic quantity can be achieved by arranging for stresses generated by the dynamic quantity to be applied in opposite phases to two piezoelectric vibrators. For example, by arranging for a stress difference between two piezoelectric vibrators to be generated by angular acceleration, an angular acceleration sensor can be achieved. Also, by arranging for a stress difference between two piezoelectric vibrators to be generated by angular velocity, an angular velocity sensor can be achieved. Furthermore, by arranging for a stress difference between two piezoelectric vibrators to be generated by a load, a load sensor can be achieved.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A dynamic-quantity sensor comprising:
   two piezoelectric vibrators to which stresses generated by a dynamic quantity are applied in opposite phases, a resistor being connected in a current path of each of the piezoelectric vibrators;
   a voltage signal applying circuit arranged to apply a common voltage signal to the piezoelectric vibrators;
   a current-voltage converting circuit arranged to convert current signals flowing in the piezoelectric vibrators into voltage signals;
   a phase-difference signal processing circuit arranged to detect a phase difference between the voltage signals output from the current-voltage converting circuit and to output a dynamic quantity sensing signal; and
   a series circuit including a capacitor and a switching circuit turning on or turning off in synchronization with an external control signal, the series circuit being provided between a constant potential and a node between one of the piezoelectric vibrators and the resistor.

2. The dynamic-quantity sensor according to claim 1, wherein:
   the switching circuit includes a switching element arranged to electrically connector or disconnect two input/output terminals in accordance with a control signal to a control terminal, a transistor connected in series with the switching element, and a bias circuit arranged to turn on the transistor when the switching element is turned on; and
   a series circuit including the switching element and the transistor is provided between a supply voltage line and a ground, and one end of the capacitor is connected to a node between the switching element and the transistor.

3. The dynamic-quantity sensor according to claim 1, wherein the dynamic quantity is acceleration.

4. The dynamic-quantity sensor according to claim 1, wherein the dynamic quantity is angular acceleration.

5. The dynamic-quantity sensor according to claim 1, wherein the dynamic quantity is angular velocity.

6. The dynamic-quantity sensor according to claim 1, wherein the dynamic quantity is a load.

7. The dynamic-quantity sensor according to claim 1, wherein the current-voltage converting circuit is arranged to output a combined signal including signals output from each of the two piezoelectric vibrators.

8. The dynamic-quantity sensor according to claim 1, wherein voltage signal applying circuit amplifies the voltage of the combined signal, limits the amplitude, controls the phase, and feeds the voltage signal back to a node between the two piezoelectric vibrators.

9. The dynamic-quantity sensor according to claim 1, wherein the dynamic quantity sensing signal output by the phase-difference signal processing circuit is proportional to a phase difference between the signals output from the two piezoelectric vibrators.

10. The dynamic-quantity sensor according to claim 1, further comprising an amplification and filter circuit that is arranged to amplify the signal output by the phase-difference signal processing circuit with a predetermined gain and to eliminate components in an unwanted frequency range so as to output an acceleration sensing signal.

11. The dynamic-quantity sensor according to claim 1, wherein the series circuit including the capacitor and the switching circuit is a self diagnosis circuit to determine whether or not the output from the phase-difference signal processing circuit represents a predetermined change due to the phase change.

12. The dynamic-quantity sensor according to claim 1, wherein the switching circuit of the series circuit is a complementary metal-oxide semiconductor analog switch.

13. The dynamic-quantity sensor according to claim 2, wherein the series circuit includes a resistor defining a load resistor for the transistor, and additional resistors arranged to define a bias circuit for the transistor.

14. The dynamic-quantity sensor according to claim 1, wherein the current-voltage converting circuit includes a first current-voltage converting circuit including an operational amplifier and a feedback resistor, and a second current-voltage converting circuit including an operational amplifier and a feedback resistor.

15. The dynamic-quantity sensor according to claim 14, wherein the current-voltage converting circuit further includes an adding circuit including an operational amplifier and resistors.

* * * * *